INVENTORS
Thomas J. Hosea &
BY Lucien W. Pryor
ATTORNEY

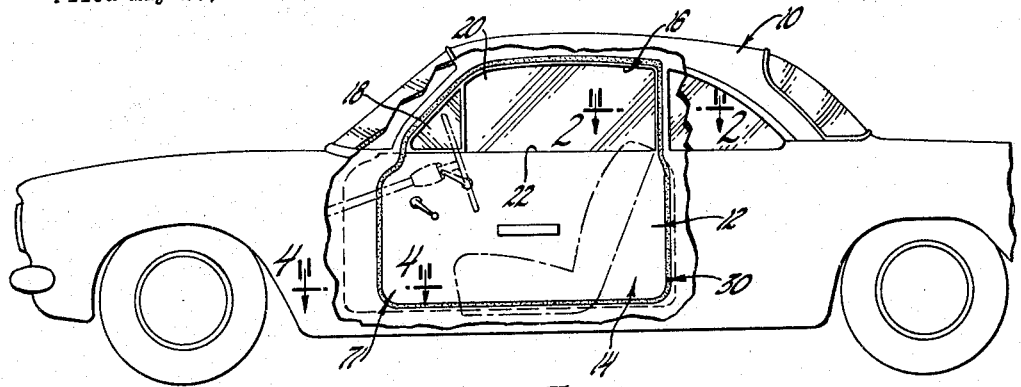
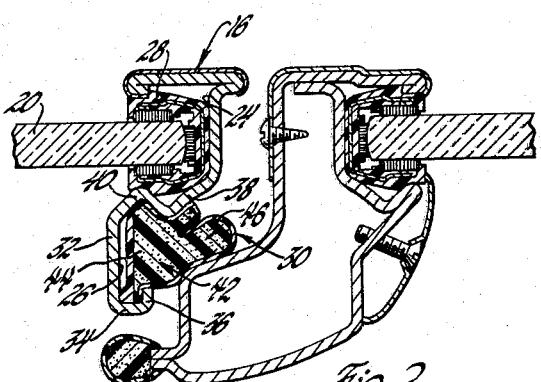
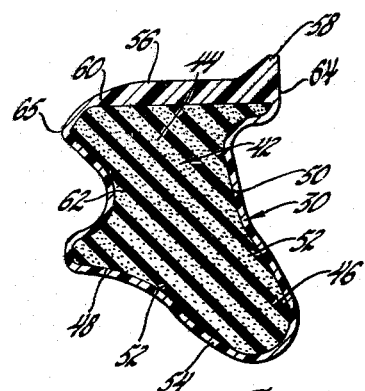

United States Patent Office 3,153,265
Patented Oct. 20, 1964

3,153,265
WEATHERSTRIP WITH MOISTURE DEFLECTORS
Thomas J. Hosea, Grosse Pointe Woods, Mich., and Lucien W. Pryor, Anderson, Ind., assignors to General Motors Corporation, Detroit, Mich., a corporation of Delaware
Filed May 26, 1961, Ser. No. 112,844
7 Claims. (Cl. 20—69)

This invention relates to sealing strips and more particularly to flexible elongate sealing strips for sealing closures.

The sealing strip of this invention is of the general type including a resilient elongate body of polyvinyl resin foam material and an outer coextensive layer of substantially non-porous or solid polyvinyl resin which is fused to the body so as to engage the body entirely within the outer layer, and is an improvement over that shown in the copending application of Alley et al., S.N. 17,639, filed March 25, 1960, and now abandoned, assigned to the assignee of this invention.

One of the features of the sealing strip of this invention is that it includes improved means for assembling the strip to a generally channel-shaped member to be sealed and provided with generally undercut side wall portions which receive laterally extending rib portions of the strip. Another feature of the sealing strip of this invention is that it includes improved means cooperating with a wall portion of a member on which the weatherstrip is mounted so as to divert water passing along said wall portion outwardly of the member to thereby prevent the entry of this water into the interior of a vehicle body or otherwise on which the member is mounted.

These and other features of the invention will be readily apparent from the following specification and drawings wherein:

FIGURE 1 is a partially broken away partial side elevational view of a vehicle body having a door mounted thereon for movement between open and closed positions, with the door mounting a sealing strip which seals the door to the body;

FIGURE 2 is an enlarged sectional view taken generally along the plane indicated by line 2—2 of FIGURE 1;

FIGURE 3 is an enlarged cross-sectional view of the sealing strip above the belt line of the body;

FIGURE 4 is an enlarged sectional view taken generally along the plane indicated by 4—4 of FIGURE 1;

FIGURE 5 is an enlarged cross-sectional view of the sealing strip below the belt line of the body;

Figure 6:
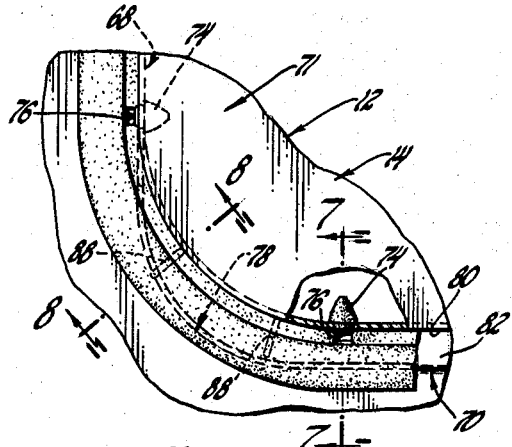
FIGURE 6 is an enlarged view of a portion of FIGURE 1.

Referring now particularly to FIGURE 1 of the drawings, a vehicle body 10 includes a front door 12 which is hinged to the body adjacent its forward edge for swinging movement between a closed position, as shown, and an open position, not shown, with the door being latched to the body in its closed position by suitable latching means mounted on the rearward edge of the door. Door 12 includes a lower door section 14 and an upper door window frame section 16 which defines the door window opening for the swingable ventilation window 18 and the vertically movable door window 20. The upper edge of the lower section 14 of the door defines what is commonly known as the belt line 22 of the body.

Door 12 is sealed to the body by a continuous sealing strip according to this invention. The section 16 of the door is the same as that shown in Wernig 2,941,838 and accordingly only those details necessary for an understanding of this invention will be described.

As shown in FIGURE 2, the section 16 generally comprises a rolled sheet metal member having oppositely opening channels 24 and 26 which share a common inner wall and respectively receive and mount the glass run channel 28 for the door window 20 and a weatherstrip 30 according to this invention to seal the door 12 to the body 10 when the door is in closed position. The channel 26 includes a base wall 32 and an inner side wall 34 terminating in a laterally extending flange 36 so as to define one generally undercut side wall portion of the channel 26, with the common inner wall between channels 24 and 26 including oppositely extending ribs 38 and 40, the latter of which defines the other generally undercut side wall portion of the channel 26.

As shown in FIGURE 3, the sealing strip 30 above the belt line of the body includes a resilient elongate body 42 of polyvinyl resin foam material. Body 42 generally includes a base section 44 and an integral angularly outwardly extending sealing lip 46 which projects from one of the upper corners of the base section and is joined to the upper wall 48 and side wall 50 of the base section by arcuate juncture portions 52 to increase the ability of the sealing lip 46 to flex independently of the base section. The body of the sealing strip is encased within an outer coextensive layer 54 of solid or substantially non-porous polyvinyl resin which is fused to the body 42. The layer 54 is generally thin, as shown, around the side and upper walls of the base section and around the sealing lip 46. Around the lower wall of the base section, the outer layer 54 is substantially thickened at 56 and includes a laterally extending sealing rib 58 adjacent the side wall 50 and at one lower corner of the base section. The thickened layer 56 gradually tapers or thins on an arcuate juncture portion 60 to join with the outer layer 54 adjacent the side wall 62 and opposite lower corner of the base section for a purpose which will now be described.

When the sealing strip 30 is mounted within the channel 26, the rib portion 64 of the strip, including the sealing rib 58, is first fitted into the one undercut side wall portion of channel 26 defined by wall 34 and flange 36. The sealing rib 58 is substantially or partially collapsed during this insertion as shown in FIGURE 2. Thereafter the strip 30 is pressed inwardly within the channel 26 as the arcuate juncture portion 60 slides over the rib 38 and the rib portion 65 of the strip is received within the rib 40 to mount the sealing strip within the section 16. The arcuate juncture portion 60 provides for ease of insertion of the strip within the channel 26 and is one of the features of the sealing strip of this invention.

The door upper window frame section 16 extends only to the belt line of the body, and below the belt line of the body the sealing strip 30 changes slightly in cross section and is secured to the lower portion 14 of the door in a different manner as will be described.

With reference to FIGURES 5, 7, 8 and 9 of the drawings, the sealing strip 30 below the belt line of the door is substantially the same in cross section as above the belt line, except that the portion 60 is dispensed with and merges into a laterally extending sealing rib 66 which is adapted to abut and seal against the side and lower walls of the lower section 14 of door 12. The transition in cross sectional shape is clearly shown in FIGURE 9 of the drawings.

Figure 9:
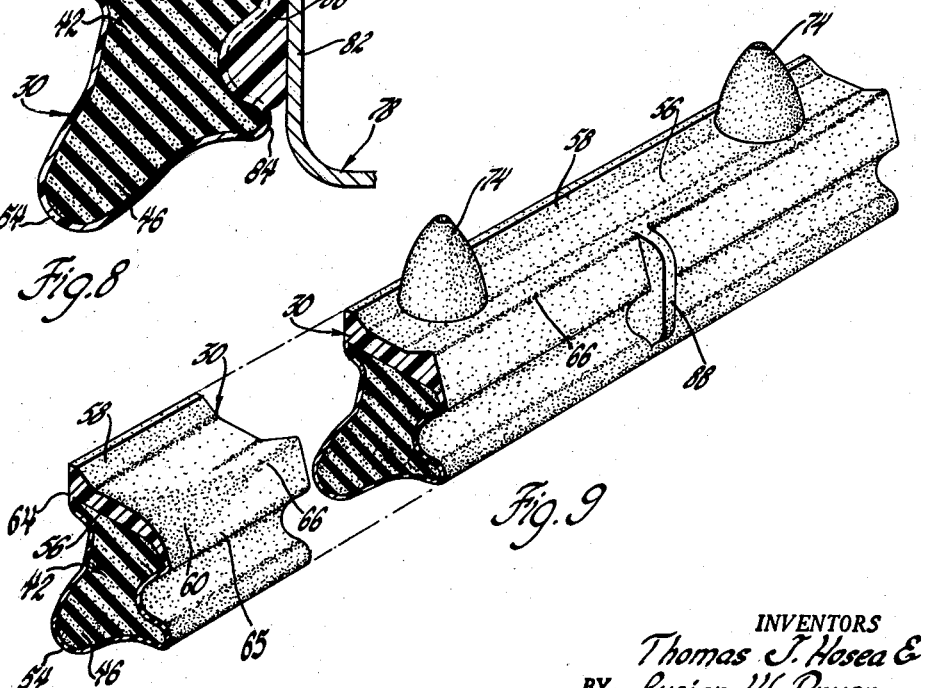
FIGURE 9 is a perspective view of the sealing strip.

The section 14 of door 12 forms no part of this invention since it is of conventional construction and includes a front wall 68, a similar rear wall, and a lower wall 70, with these walls spacing and joining the door inner and outer panels 71 and 72 respectively. The weatherstrip 30 is secured to the walls of section 14 of the door by providing the strip with a series of attachment buttons 74 as shown in FIGURES 6, 7 and 9 with these buttons being received within apertures provided in the walls of the door and being adapted to be stretched prior to insertion by a suitable tool inserted within passages 76 of the buttons, as is more fully described in the aforementioned copending application of Alley et al.

Figure 7:
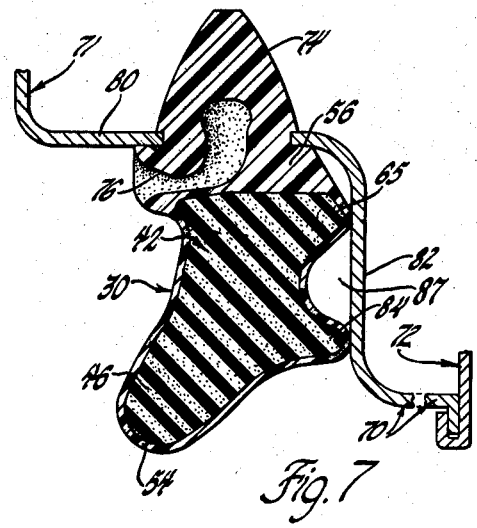
FIGURE 7 is an enlarged sectional view taken generally along the plane indicated by line 7—7 of FIGURE 6.

With particular reference to FIGURES 4, 6, 7 and 8 of the drawings, the front wall 68 merges on an arcuate juncture wall 78 with the lower wall 70. Walls 70 and 78 are joined to the inner panel 71 by a rabbeted portion including a horizontally extending wall portion or section 80, to which the strip 30 is mounted, and a vertically extending wall portion or section 82 which is located generally normal to the wall section 80. Wall section 80 joins to the door inner panel 71 and merges into wall 68, while wall section 82 joins to walls 68 and 70 and follows the plane of these walls. Strip 30 follows the contour of wall 68 and wall section 80, with the rib portion 65 and sealing lip 84 normally abutting the wall section 82 as shown in FIGURE 7.

Water is very apt to run downwardly along the wall 68 of the door, outboard of the strip 30 in the area 86 of this wall as indicated in FIGURE 4. As the water reaches the lower front corner of the door, it will pass into the passage 87 which is defined by the wall section 82 and the body of the sealing strip intermediate the rib portion 65 and sealing lip 84. As the passage 87 becomes filled with water, the pressure head created by the water will force the water past the rib portion 65 and over the base section 56 of the sealing strip into the interior of the car. The sealing lip 84 is tightly held against the wall section 82 inasmuch as the sealing lip 46 of the strip is deflected rather than compressed at the lower front corner portion of the door and along the bottom edge thereof. Thus, it is impossible for the water to pass along the wall section 82 and outboard of the sealing strip past the sealing lip 84.

The tendency of the water to pass into the interior of the car between the base 56 of the weatherstrip and the wall section 80 is aided by the fact that a vacuum is usually created inside the vehicle body when the vehicle is traveling at high speeds.

Figure 8:
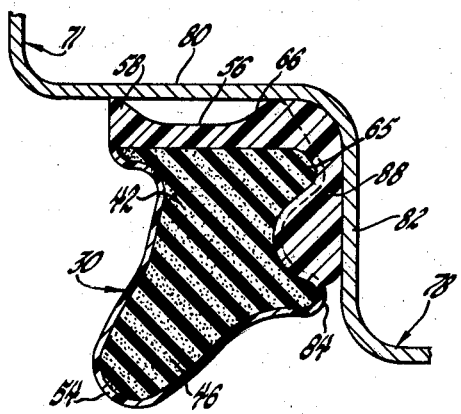
FIGURE 8 is an enlarged sectional view taken generally along the plane indicated by line 8—8 of FIGURE 6.

In order to prevent the entry of water into the interior of the car along the wall section 80, the strip 30 is provided with a plurality of dams or water deflectors 88 as shown in FIGURES 6, 8 and 9 which deflect the water passing along the wall section 82 outwardly of the door 12 and outboard of the strip 30. As shown in FIGURE 6, the deflectors are located generally normal to the wall sections 80 and 82.

As shown in FIGURE 8, each such deflector 88 is integral with the strip 30 and is in the form of a rib or lip, the outer edge of which conforms to the shape of the wall sections 80 and 82 and the juncture portion between these wall sections. The deflector extends generally from the lip 84 to the rib 66 of the base section 56, generally transversely of the strip 30, of the lip 84, of the rib portion 65, and of the rib 66. As shown in FIGURE 7, the lip 84 and rib portion 65 normally abut the wall section 82 due to the location of the buttons 74 and the apertures in the wall section 80. The dams or deflectors 88 force the rib portion 65 and lip 84 away from the wall section 82 and the reaction of the strip 30 tends to force the dams or deflectors tightly against the wall sections 80 and 82. By having the deflectors 88 force the sealing lip 84 away from the wall section 82, the water can pass to the outboard side of the sealing strip between the sealing lip 84 and the wall section 82.

Thus, this invention provides a new and improved flexible elongate sealing strip for sealing closures.

What is claimed is:

1. A flexible sealing strip for sealing a wall of a member on which said strip is mounted comprising, a resilient elongate body including a base section having a side wall provided with a portion projecting toward said wall of said member and adapted to engage said member, and a sealing rib projecting from said side wall in the same direction as said portion and including a part extending beyond said portion toward said wall of said member, said rib being located transversely of said base section and having an edge portion secured to said side wall and an opposite edge portion on said part abutting said wall of said member to resiliently space said portion from said wall of said member.

2. A flexible sealing strip for sealing a wall of a member on which said strip is mounted comprising, a resilient elongate body including a base section having a side wall, an elongate lip projecting from said side wall of said base section toward said wall of said member and adapted to engage said member, and a sealing rib projecting from said side wall in the same direction as said lip and including a portion extending beyond said lip toward said wall of said member, said rib being located transversely of said lip and said base section and said extending portion abutting said wall of said member to resiliently space said lip from said wall of said member.

3. A flexible sealing strip for sealing a wall of a member on which said strip is mounted comprising, a resilient elongate body including a base section having a side wall, an elongate lip projecting from said side wall of said base section toward said wall of said member and adapted to engage said wall of said member, and a sealing rib projecting from said side wall in the same direction as said lip and including a part extending beyond said lip toward said wall of said member, said rib being located transversely of said lip and said base section and having an edge portion abutting said wall of said member and shaped to the contour thereof to seal thereagainst and to resiliently space said lip from said wall of said member.

4. A flexible sealing strip comprising, a resilient elongate body including a base section having a side wall, spaced elongate portions projecting from said side wall of said base section, and a flexible rib projecting from said side wall in the same direction as said portions, said rib being located transversely of said elongate portions and said base section and adapted to abut a wall of a member on which said strip is mounted.

5. A flexible sealing strip comprising, a resilient elongate body including a base section having a pair of spaced side walls, a sealing rib projecting laterally from the bottom of said base section adjacent one of the side walls thereof, a sealing lip projecting from the top of said base section adjacent the other side wall thereof, an elongate rib projecting oppositely to said sealing lip from said one side wall of said base section adjacent the top thereof, and a third rib projecting outwardly from said one side wall, said third rib being located transversely of said sealing and elongate ribs and said base section and adapted to abut a wall of a member on which said strip is mounted.

6. In combination with a vehicle body having a wall member to be sealed and including wall sections located generally normal to each other, a flexible sealing strip comprising, a resilient elongate body including a base section adapted to be mounted on one of said wall sections and having a side wall juxtaposed to the other wall section, an elongate lip projecting said side wall of said base section toward said other wall section, and a sealing rib projecting outwardly from said side wall and extending transversely of said elongate lip, said side wall and said base section and abutting said other wall section.

7. In combination with a vehicle body having a member to be sealed, said member including a generally vertically extending side wall merging on an arcuate juncture wall with a generally horizontally extending lower wall, said arcuate wall and said lower wall including wall portions located generally normal to each other, a flexible sealing strip comprising, a resilient elongate body including a base section having a side wall and a lower surface, the lower surface of said base section abutting and following the contour of said vertically extending side wall and one of said wall portions of said arcuate wall and said lower wall, said side wall of said base section being located in spaced juxtaposed relation to the other wall portion of said arcuate wall and said lower wall, and water diverting means sealing the space between said side wall of said base section and said other wall portion, said water diverting means being located angularly to said one wall portion to divert water passing along said vertically extending side wall and said one wall portion.

References Cited in the file of this patent

UNITED STATES PATENTS

| | | |
|---|---|---|
| 2,023,917 | Darbyshire | Dec. 10, 1935 |
| 2,716,787 | Harris | Sept. 6, 1955 |
| 2,884,668 | Harris et al. | May 5, 1959 |
| 2,905,985 | Garrett et al. | Sept. 29, 1959 |
| 2,919,478 | Sehn et al. | Jan. 5, 1960 |
| 2,922,675 | Wernig | Jan. 26, 1960 |
| 2,949,651 | Hill | Aug. 23, 1960 |